UNITED STATES PATENT OFFICE.

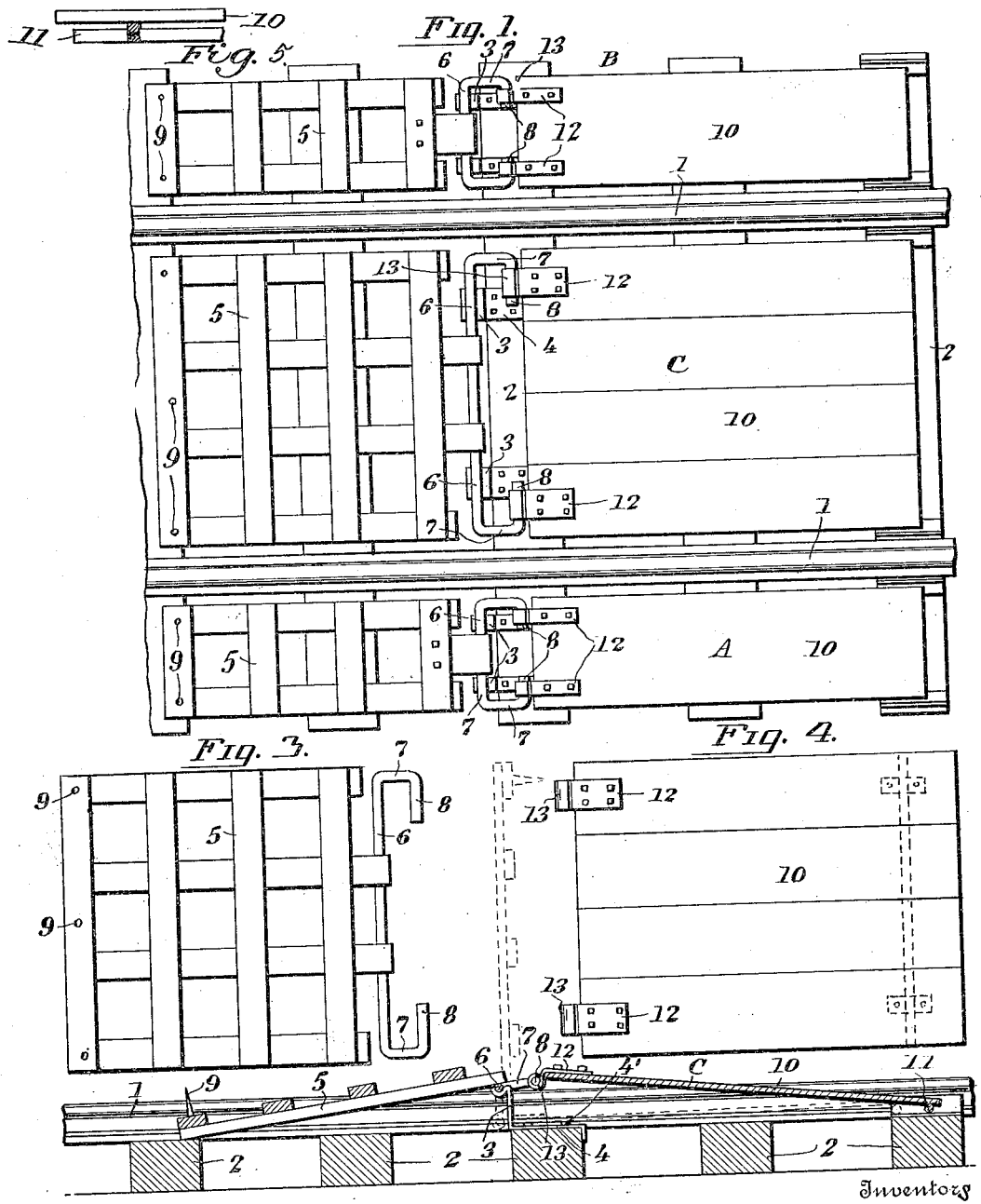

BARTON ESTES, OF SEATTLE, AND EDGAR B. ROBINSON, OF HOUGHTON, WASHINGTON.

CATTLE-GUARD.

1,138,548.   Specification of Letters Patent.   Patented May 4, 1915.

Application filed September 24, 1913. Serial No. 791,618.

*To all whom it may concern:*

Be it known that we, BARTON ESTES and EDGAR B. ROBINSON, citizens of the United States, residing at Seattle and Houghton, respectively, in the county of King and State of Washington, have invented new and useful Improvements in Cattle-Guards, of which the following is a specification.

This invention relates to cattle guards and is in the nature of an improvement upon Letters-Patent No. 1,049,468, granted January 7, 1913, the object of the present invention being to simplify the construction set forth in said prior patent and at the same time cheapen the cost of manufacture and render the device more reliable and easy in its operation, at the same time dispensing with certain parts of the structure embodied in said patent.

With the above and other objects in view, the invention consists in the construction combination and arrangement of parts, as will hereinafter be more fully described, illustrated and claimed.

In the accompanying drawings:—Figure 1 is a plan view of the improved cattle guard. Fig. 2 is a vertical longitudinal section through the same taken in line with one of the supporting stirrups showing the gate in its normal position in full lines and illustrating the operative position thereof by dotted lines. Fig. 3 is a plan view of the gate detached. Fig. 4 is a similar view of the platform detached. Fig. 5 is a fragmentary view showing the supporting roller in relation to the platform.

Referring to the drawings, 1 designates a pair of railway rails supported in the usual manner upon parallel ties or sleepers 2.

The cattle guard of this invention is shown as comprising three sections A, B and C, the sections A and B lying at the outside of the railway rails 1 and the section C being shown as interposed between the rails, the object of this arrangement being to prevent animals from passing by the cattle guard either between the rails or at the opposite sides thereof, the side guards being of sufficient width to extend to the usual fence terminals. As all of the sections A, B and C involve the same elements combined under the same relative arrangement and operating exactly on the same principle, a description of one section will answer for all.

Each cattle guard section comprises a plurality of supporting stirrups 3 each of which is preferably constructed and arranged as shown in Figs. 1 and 2 in which it will be observed that the supporting stirrup is formed of strap iron having a base 4 adapted to rest on the top of one of the ties to which it is spiked as shown at 4' to hold the stirrup fixedly in place. Two of such stirrups are preferably employed in connection with each cattle guard section as indicated in Fig. 1.

The gate 5 may be of any desired length and width and has secured thereto along one edge thereof a hinge shaft 6 which rests in the stirrups 3. At the outer extremities of the shaft 6, are cranks 7 having inwardly extending pintles 8 at their extremities the purpose of which will appear. The gate is also provided on its upper side and near its free edge with spikes 9 adapted to prick the legs of the animal when the gate is thrown upward by the means hereinafter described.

10 designates a depressible platform which is provided adjacent to one edge with a roller 11, said roller being attached to the platform 10 by straps or the like and resting upon one of the ties 2 on which it is adapted to roll when the opposite end of the platform is depressed and elevated. At its opposite edge, the depressible platform 10 is provided with straps 12 having their ends bent to form eyes 13 which receive the pintles 8 above referred to. Thus the depressible platform is attached to the tilting gate by a jointed connection forming in effect a hinge while the opposite edge of the platform is supported by the roller 11 on one of the ties.

In lieu of the particular form of stirrup shown in Figs. 1 and 2, either of the forms of stirrup shown at 14 in Figs. 5 and 6 may be employed, each of said stirrups being formed with a metal strap secured to a supporting post 15 driven into the ground. It is also within the scope of this invention to employ the form of stirrup shown in Fig. 7 consisting of a metal post 16 driven into the ground and having a concaved seat 17 in the upper end thereof which forms one of the supporting stirrups for the tilting gate.

From the foregoing description it will be seen that when the animal places his front feet on the depressible platform, the platform moves downwardly and bears down on the pintles 8 thereby rocking the tilting gate on its shaft 6 as a center, throwing the gate from a substantially horizontal position illustrated by full lines in Fig. 2 upward to a substantially vertical position as shown by dotted lines in the same figure. The gate thus interferes with the further progress of the animal and after said animal retreats from the platform, the gate returns by gravity to its horizontal position where it will not interfere in any way with railroad traffic.

By reason of the particular construction and arrangement of the shaft, cranks and pintles illustrated and described herein, the gate 5 may be made the full width of the distance between the rails so that the sections A, B and C of the cattle guard will form an almost continuous bar or fence across the road bed, only a small space being left between the adjacent edges of the gates 5 due to the presence of the rails 1 when the gates 5 are folded downwardly flush with or below the tops of said rails as indicated in Fig. 2. It will also be noted that the stirrups 3 need not be disturbed in order to apply and remove the gate and its operating platform for the reason that said stirrups are provided with sockets open at the top thereof into which the shaft 6 may be placed and from which said shaft may be removed by merely lifting the gate and platform while still connected and ready for instantaneous operation. This feature is particularly valuable in the time of floods, inundations, prairie fires and the like and it will enable the gates and their operating platforms to be quickly removed and transferred to a place of safety, it only being necessary to lift said parts from their operative positions and fold the platforms and gates compactly together. This is also particularly desirable for the reason that in case of water submerging the bed of the railway, the gates and platforms may be removed and prevented from floating about so as to endanger the safety of the trains.

What we claim is:—

A cattle guard comprising a hinged gate having a hinge rod extending along the bottom edge thereof and fastened rigidly thereto, the end portions of said rod being bent at the corners of the gate and extended at right angles away from the gate to form crank arms, the ends of the latter being extended toward each other to form pintles, supporting stirrups for said hinge rod having sockets open on top in which said rod is placed adapting the connected gate and platform to be lifted out of position without disturbing said stirrups, a depressible platform having fixedly attached eyes receiving said pintles, and a roller carried by said platform and journaled in bearings secured to the bottom face of said platform.

In testimony whereof we affix our signatures in presence of two witnesses.

BARTON ESTES.
EDGAR B. ROBINSON.

Witnesses:
HELEN SIEBERT,
S. A. HUSON.

Copies of this patent may be obtained for five cents each, by addressing the "Commissioner of Patents, Washington, D. C."